United States Patent

[11] 3,588,011

| [72] | Inventors | Axel Gote Peres<br>Vasagatan 3B, 79500 Rattvik;<br>Lars Bert Ronald Ericson, Vallavagen 16,<br>79100 Falun, Sweden |
|---|---|---|
| [21] | Appl. No. | 793,741 |
| [22] | Filed | Jan. 24, 1969 |
| [45] | Patented | June 28, 1971 |
| [32] | Priority | Jan. 25, 1968 |
| [33] | | Sweden |
| [31] | | 977/68 |

[54] HOLDER CLIP FOR PIPES, CABLES, ETC.
1 Claim, 3 Drawing Figs.

[52] U.S. Cl. .................................................. 248/68, /
[51] Int. Cl. .................................................. F16l 3/08
[50] Field of Search .......................................... 248/74
(PB), 74, 68, 69; 24/8 (CC), 16 (PB)

[56] References Cited
UNITED STATES PATENTS
2,440,469  4/1948  Goddard ............................ 248/68

| 2,632,217 | 3/1953 | Flora | 248/49 |
| 3,254,866 | 6/1966 | Hamrick | 248/74 |
| 3,463,427 | 8/1969 | Fisher | 248/74X |

FOREIGN PATENTS

| 695,251 | 9/1964 | Canada | 248/74 |

Primary Examiner—Chancellor E. Harris
Attorney—Wenderoth, Lind and Ponack

ABSTRACT: A holder clip for pipes, cables etc. is made of plastic material and intended for fixation to a support by means of a fastening element. The plastic clip comprises a rigid body by which the holder clip is secured to the support and which has at least one projection directed towards the support, and a flexible portion extending from the body to embrace the pipe, cable etc., said flexible portion having the end formed with at least one hook means for engagement with the projection directed towards the support.

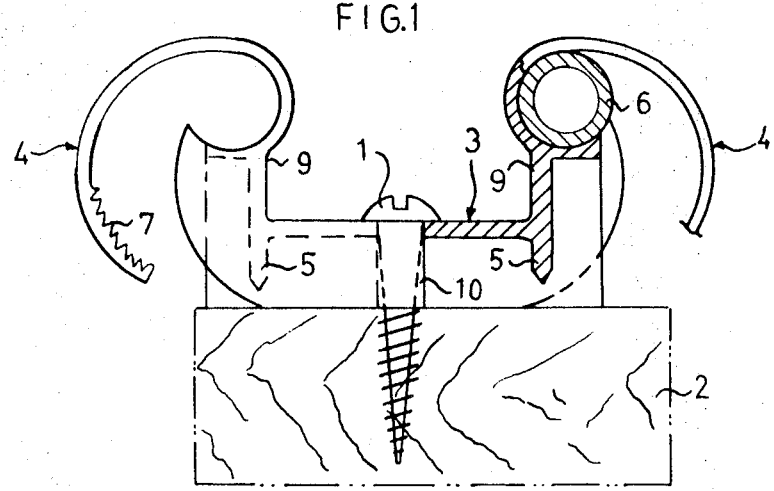
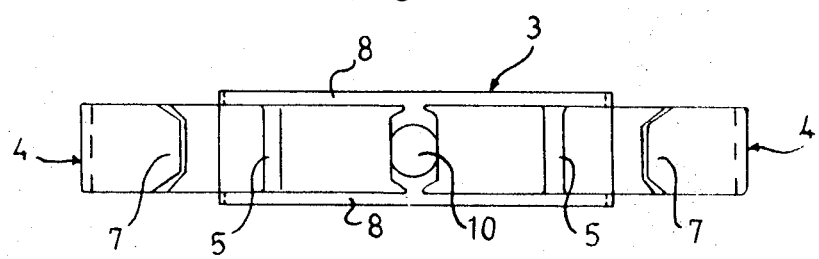
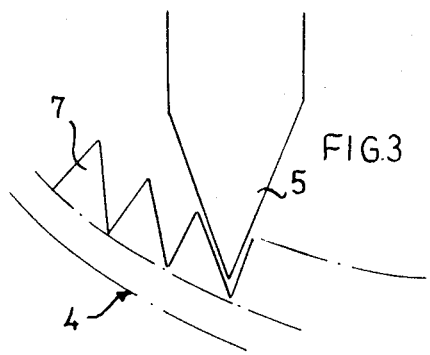
AXEL GÖTE PERES and
LARS BERT RONALD ERICSON,
Inventors

HOLDER CLIP FOR PIPES, CABLES, ETC.

This invention relates to a holder clip for pipes, cables, etc., of the type made of plastic or like elastic material and adapted for fixation to a support by means of a fastening element. The features substantially characterizing the holder clip reside in that the clip comprises a rigid body by which the holder clip is secured to the support and which has at least one projection directed to the support, and a flexible portion extending from the body to embrace the pipe, cable etc., said flexible portion having the end formed with at least one hook means for engagement with the projection directed towards the support for locking the pipe, cable etc. to the holder clip. The locking device formed by the projection and the hook means is extremely efficient since the distance of the projection to the support can be adjusted relative to the thickness of the flexible portion within the hook means. Therefore the locking action cannot be cancelled unless the fastening element of the clip is untightened from the support.

The invention will be more fully described in the following, reference being had to the accompanying drawing illustrating an embodiment, chosen by way of example, of the holder clip.

In the drawing:

FIG. 1 is a front view of the holder clip, partly in section;

FIG. 2 is a bottom plan view of the holder clip;

FIG. 3 is a view on a larger scale of some details of the holder clip.

The holder clip is made of plastic or like elastic material and adapted for fixation to a support 2 by means of a screw 1 or like fastening element. The clip comprises a rigid body 3 by which the clip is secured to the support, and at least one flexible portion 4 extending from said body. The body 3 has at least one preferably pointed projection 5 directed towards the support 2, and the flexible portion 4 which is to embrace the pipe, cable etc. 6 has the end formed with at least one hook means 7 which is adapted to engage the projection 5 directed towards the support 2 for retaining the pipe, cable etc. 6.

To permit insertion of the hook means 7 beneath the projection 5 the front end of the hook means shall be pointed. The body 3 is provided at the two ends of the projection 5 with end walls 8 preventing shifting of the hook means 7 transversely of the projection 5. The hook means 7 has a width substantially equal to the spacing of the end walls 8 whereby the hook means 7 will be well secured in locking position.

As will appear from FIG. 1 the body 3 incorporates an outwardly directed element 9 which merges in the flexible portion 4, the pipe 6 being situated at the transition between said parts 4 and 9. Said transition is formed as a seat for the pipe 6.

In the embodiment illustrated the body 3 on either side of the hole 10 for receiving the fastening screw 1 is provided with both a projection 5 directed towards the support 2 and a flexible portion 4 extending from said body and having hook means 7 for engagement with the corresponding projection 5. The holder clip is thus intended for two pipes, cables etc. lying beside one another.

As will appear from the drawing, the flexible portion 4 is provided with consecutive hook means 7 whereby the clip can be utilized for pipes, cables etc. 6 having different diameters. The exact configuration of the hook means 7 is shown to the left in FIG. 1 and the corresponding projection 5 is shown in FIG. 3. This configuration permits insertion of the hook means 7 beneath the projection 5 while making the withdrawal of said hook means from the projection impossible.

Modifications can be resorted to within the scope of the appended claim.

We claim:

1. A holder clip for pipes, cables, etc., made of plastic or like elastic material for fixation to a support (2) by means of a fastening element (1), comprising a rigid body (3) for securing the holder clip to said support (2), a projection (5) on said body directed toward said support, a flexible portion (4) extending from said body (3) to embrace a pipe (6), hook means (7) at the end of said flexible portion for engagement with said projection (5) directed towards said support (2) for locking said pipe (6) to said holder clip, said body (3) having at the sides of said projection (5) end walls (8) to prevent displacement of said hook means (7) transversely of said projection (5), said body (3) having an outwardly directed element (9) which merges with said flexible portion (4) with said pipe (6) situated at the transition between said flexible portion (4) and said outwardly directed element (9).